(12) United States Patent
Sakata (10) Patent No.: US 9,398,183 B2
(45) Date of Patent: Jul. 19, 2016

(54) IMAGE FORMING APPARATUS (71) Applicant: KYOCERA Document Solutions Inc., Osaka (JP)

(72) Inventor: Hiromi Sakata, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/923,388

(22) Filed: Oct. 26, 2015

(65) Prior Publication Data
US 2016/0127573 A1    May 5, 2016

(30) Foreign Application Priority Data

Oct. 31, 2014  (JP) ................. 2014-222421

(51) Int. Cl.
    G06F 3/12       (2006.01)
    H04N 1/00       (2006.01)
(52) U.S. Cl.
    CPC ............. H04N 1/0083 (2013.01); G06F 3/126 (2013.01); G06F 3/1267 (2013.01); H04N 1/0032 (2013.01); H04N 1/00204 (2013.01); H04N 1/00244 (2013.01); H04N 1/00411 (2013.01); H04N 1/00631 (2013.01); H04N 2201/0094 (2013.01)
(58) Field of Classification Search
    USPC ........................................................ 358/1.15
    See application file for complete search history.

(56) References Cited

U.S. PATENT DOCUMENTS

| | | | | |
|---|---|---|---|---|
| 6,219,502 B1* | 4/2001 | Osari | ................. | H04N 1/00915 399/82 |
| 6,546,313 B2* | 4/2003 | Nakahira | ............... | B65H 39/11 270/52.03 |
| 7,253,920 B2* | 8/2007 | Hosoda | .............. | G03G 15/6538 358/1.15 |
| 2008/0074692 A1* | 3/2008 | Suzuki | ............... | H04N 1/00342 358/1.15 |

FOREIGN PATENT DOCUMENTS

| | | |
|---|---|---|
| JP | 2002-226132 A | 8/2002 |
| JP | 2002-316765 A | 10/2002 |

* cited by examiner

Primary Examiner — Allen H Nguyen
(74) Attorney, Agent, or Firm — Stein IP, LLC (57) ABSTRACT An image forming apparatus has a judgment portion, a job control portion, and an operation portion. When print data is received by a reception portion, the judgment portion checks whether or not a detection portion is outputting a detection signal. When the detection portion is found to be outputting the detection signal, the job control portion inhibits a printing portion from executing the print job for the print data received by the reception portion and instead stores the print data in a storage portion. The operation portion accepts an instruction to print for an image represented by the print data stored in the storage portion. When the instruction is entered on the operation portion, the job control portion makes the printing portion execute a print job for the print data stored in the storage portion.

4 Claims, 6 Drawing Sheets

READY TO COPY (COLOR).

403

COPIES 1

JOB FINISH

30A

COPY IMAGE

DOCUMENT : A4
MAGNIFICATION : 100%
SHEET : A4

PREVIEW

AUTO
« SELECT SHEET

100%
« REDUCTION/ ENLARGEMENT

DOCUMENTS IN SAVING BOX — 33

1 SIDE TO 1 SIDE
« 2 SIDES /DIVISION — 31

SORT
« SORT/STACK

NO
« CONSOLIDATE PAGES

STANDARD
« DENSITY — 32

EASY SETTING

DOCUMENT /SHEET/FINISH

COLOR/QUALITY

LAYOUT/EDIT

MORE

IMAGE FORMING APPARATUS

INCORPORATION BY REFERENCE

This application is based upon and claims the benefit of priority from the corresponding Japanese Patent Application No. 2014-222421 filed on October 31, 2014, the entire contents of which are incorporated herein by reference.

BACKGROUND

The present disclosure relates to control for receiving data representing an image that is transmitted over a network and for discharging a printout in which the image is printed.

One example of an image forming apparatus is a network printer. A network printer is a printer shared among a plurality of users. To permit printouts to be sorted out for different users, some network printers are provided with a plurality of bins. The printouts produced as a result of a network printer executing print jobs are discharged into, and held in, the bins.

According to one known technology, in a network printer, users are previously assigned bins to which their printouts are discharged respectively, and a user who is not assigned any bin previously is assigned ad hoc, by the network printer, a usable bin out of the plurality of bins.

According to another known technology, in a network printer, a plurality of bins are each provided with an overflow detector so that, for any bin holding more than the permissible quantity of printouts, the network printer inhibits a print job that discharges a printout to that bin and instead stores in a memory the image data that is the target of the print job.

However, a bin shared with a second user is not free from the risk of a printout being taken away by the second user.

SUMMARY

According to the present disclosure, an image forming apparatus includes a judgment portion, a job control portion, and an operation portion. When print data is received by a reception portion, the judgment portion checks whether or not a detection portion is outputting a detection signal for a sheet discharge portion to which a printout is to be discharged when a print job is executed for the print data received by the reception portion. When the detection portion is found to be outputting the detection signal, the job control portion inhibits a printing portion from executing the print job for the print data received by the reception portion and instead stores the print data in a storage portion. The operation portion accepts an instruction to print for an image represented by the print data stored in the storage portion. When the instruction is entered on the operation portion, the job control portion makes the printing portion execute a print job for the print data stored in the storage portion.

Further features and advantages of the present disclosure will become apparent from the description of embodiments given below.

DETAILED DESCRIPTION

Figure 1:
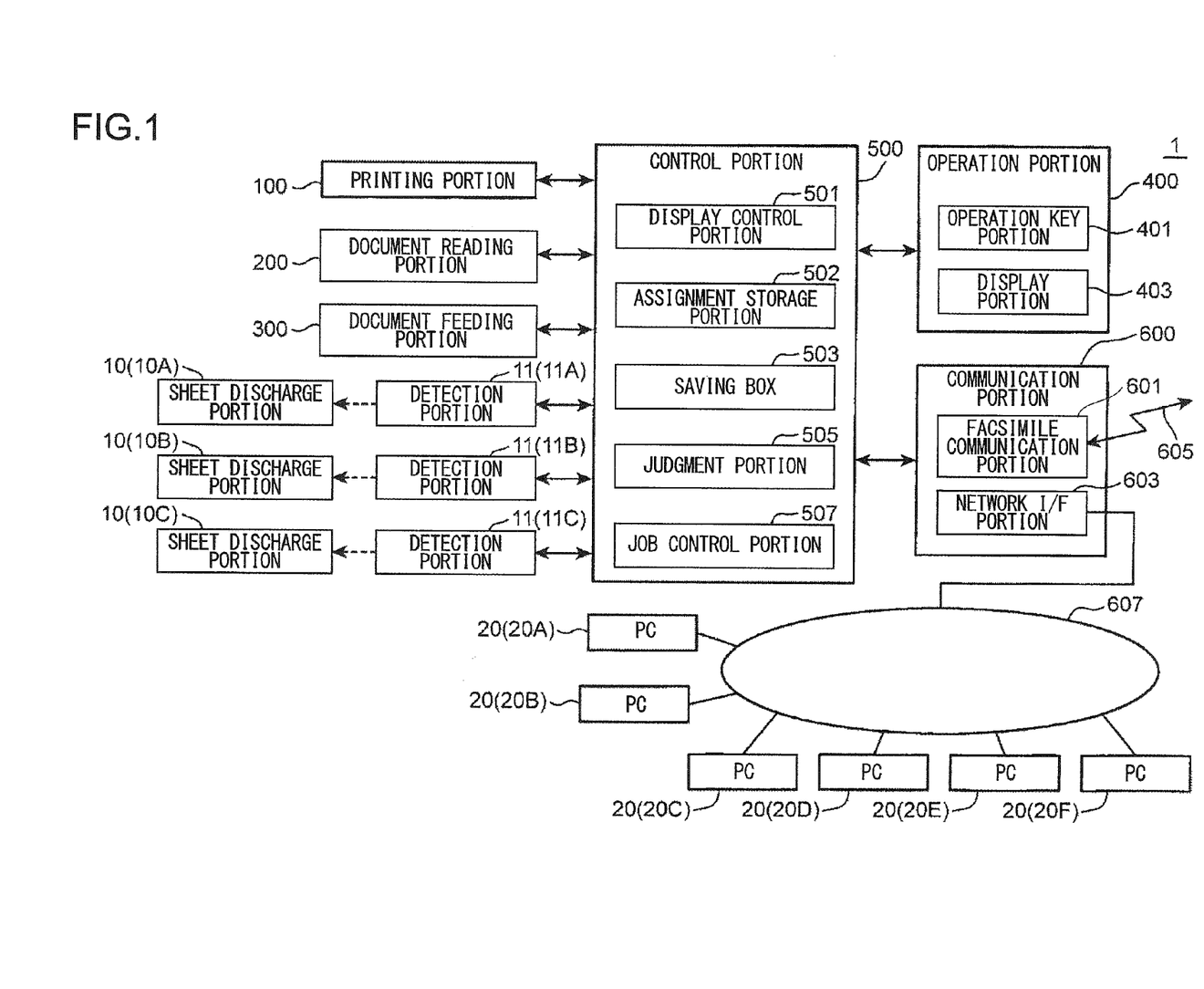
FIG. 1 is a block diagram showing a configuration of an image forming apparatus according to one embodiment of the present disclosure.

Hereinafter, an embodiment of the present disclosure will be described in detail with reference to the accompanying drawings. FIG. 1 is a block diagram showing a configuration of an image forming apparatus 1 according to one embodiment of the present disclosure. As an example of the image forming apparatus 1, a digital multifunction peripheral having the functions of a copier, a printer, a scanner, and a facsimile machine will be described. The image forming apparatus 1 can be any apparatus having a function of printing an image, and is not limited to a digital multifunction peripheral; the image forming apparatus 1 can be, for example, a printer. The image forming apparatus 1 includes a printing portion 100, a document reading portion 200, a document feeding portion 300, an operation portion 400, a control portion 500, a communication portion 600, a sheet discharge portion 10, and a detection portion 11.

When, as a document, a single leaf is placed on a document placement portion provided in the document feeding portion 300, the document feeding portion 300 feeds the leaf to the document reading portion 200. When, as a document, a plurality of leaves are placed on the document placement portion, the document feeding portion 300 feeds the leaves sequentially to the document reading portion 200.

The document reading portion 200 reads a document placed on a document stand or a document fed from the document feeding portion 300, and outputs the image data of the document.

The printing portion 100 executes a print job. A print job is a job whereby, with respect to data representing an image (e.g., image data output from the document reading portion 200, print data transmitted from a personal computer 20, or image data received by facsimile), a printout is produced in which the image represented by the image data is printed.

The printout produced by the printing portion 100 is discharged to, and held in, the sheet discharge portion 10. The sheet discharge portion 10 is called a sheet discharge tray or a bin. The image forming apparatus 1 is provided with three sheet discharge portions (trays) 10A, 10B, and 10C. So long as no distinction is needed among the sheet discharge portions 10A, 10B, and 10C, these are collectively referred to as the sheet discharge portion 10. Although the following description assumes a plurality of sheet discharge portions, there can be provided only one sheet discharge portion. The plurality of sheet discharge portions 10 are together occasionally called a mail box.

When the sheet discharge portion 10 holds any printout, the detection portion 11 outputs a detection signal. The detection portion 11 can be a sensor or a switch. The detection portion 11 is provided for each sheet discharge portion 10; thus, the image forming apparatus 1 is provided with three detection portions 11A, 11B, and 11C. So long as no distinction is needed among the detection portions 11A, 11B, and 110, these are collectively referred to as the detection portion 11.

The operation portion 400 includes an operation key portion 401 and a display portion 403. The display portion 403 has a touch panel function, and displays a screen with software keys. By operating the software keys while viewing the screen, a user can make settings and perform other operations necessary to execute copying and other functions.

The operation key portion 401 includes operation keys that are hardware keys. The operation keys include, for example, a START key, a numerical key pad, a RESET key, and function select keys for switching among copying, printing, scanning, and facsimile.

The control portion 500 includes a CPU (central processing unit), ROM (read-only memory), and RAM (random-access memory). The CPU performs, with respect to the above-described components (e.g., the printing portion 100) of the image forming apparatus 1, control necessary to make the image forming apparatus 1 operate. The ROM stores software necessary to control the operation of the image forming apparatus 1. The RAM is used for temporary storage of data generated during the execution of software, for storage of application software, and for other purposes.

The control portion 500 includes, as functional blocks, a display control portion 501, an assignment storage portion 502, a saving box 503, a judgment portion 505, and a job control portion 507. These blocks will be described in detail later.

The communication portion 600 includes a facsimile communication portion 601 and a network I/F (interface) portion 603. The facsimile communication portion 601 includes an NCU (network control unit) for controlling connection with a destination facsimile machine over a telephone network and a modem (modulator-demodulator) circuit for facsimile communication. The facsimile communication portion 601 is connected to a telephone network 605.

The network I/F portion 603 is connected to a LAN (local area network) 607. The network I/F portion 603 is a communication interface circuit for conducting communication with a personal computer 20 (terminal device) connected to the LAN 607. In FIG. 1 are shown a plurality of personal computers (PCs) 20A, 20B, 20C, 20D, 20E, and 20F connected to the LAN 607. So long as no distinction is needed among them, these personal computers are collectively referred to as the personal computer 20.

Over the LAN 607, the network I/F portion 603 receives print data transmitted from a personal computer. Thus, the network I/F portion 603 functions as a reception portion for receiving data representing an image that is transmitted over the network. Although the following description assumes print data as data representing an image, this is not meant as any limitation; it can instead be any data that is called image data.

The display control portion 501 performs control for displaying a screen on the display portion 403.

The assignment storage portion 502 has assignment information previously stored in it. Assignment information is information indicating which personal computer 20 is assigned which sheet discharge portion 10. Suppose the assignment information indicates that the personal computers 20A and 20B are assigned the sheet discharge portion 10A, the personal computers 20C and 30D are assigned the sheet discharge portion 10B, and the personal computers 20E and 20F are assigned the sheet discharge portion 100. In this case, when the printing portion 100 executes a print job in response to print data transmitted from the personal computer 20A, the job control portion 507 so controls as to discharge the printout to the sheet discharge portion 10A. The assignment information is stored in the assignment storage portion 502 as a result of the operation portion 400 being operated by an administrator or a service person of the image forming apparatus 1.

When the network I/F portion 603 receives print data, with respect to the sheet discharge portion 10 to which a printout will be discharged when a print job is executed for the print data received by the network I/F portion 603, the judgment portion 505 checks whether or not the corresponding detection portion 11 is outputting a detection signal.

If the judgment portion 505 finds that the detection portion 11 is outputting a detecting signal, the job control portion 507 inhibits the printing portion 100 from executing the print job for the print data received by the network I/F portion 603 and instead stores the print data in the saving box 503. The saving box 503 is one specific example of a storage portion. Any non-volatile memory or hard disk drive provided in the image forming apparatus 1 can be used as the saving box 503.

When, for the image represented by the print data stored in the saving box 503, an instruction to print is entered on the operation portion 400, the job control portion 507 makes the printing portion 100 execute a print job for the print data stored in the saving box 503.

Figure 2:
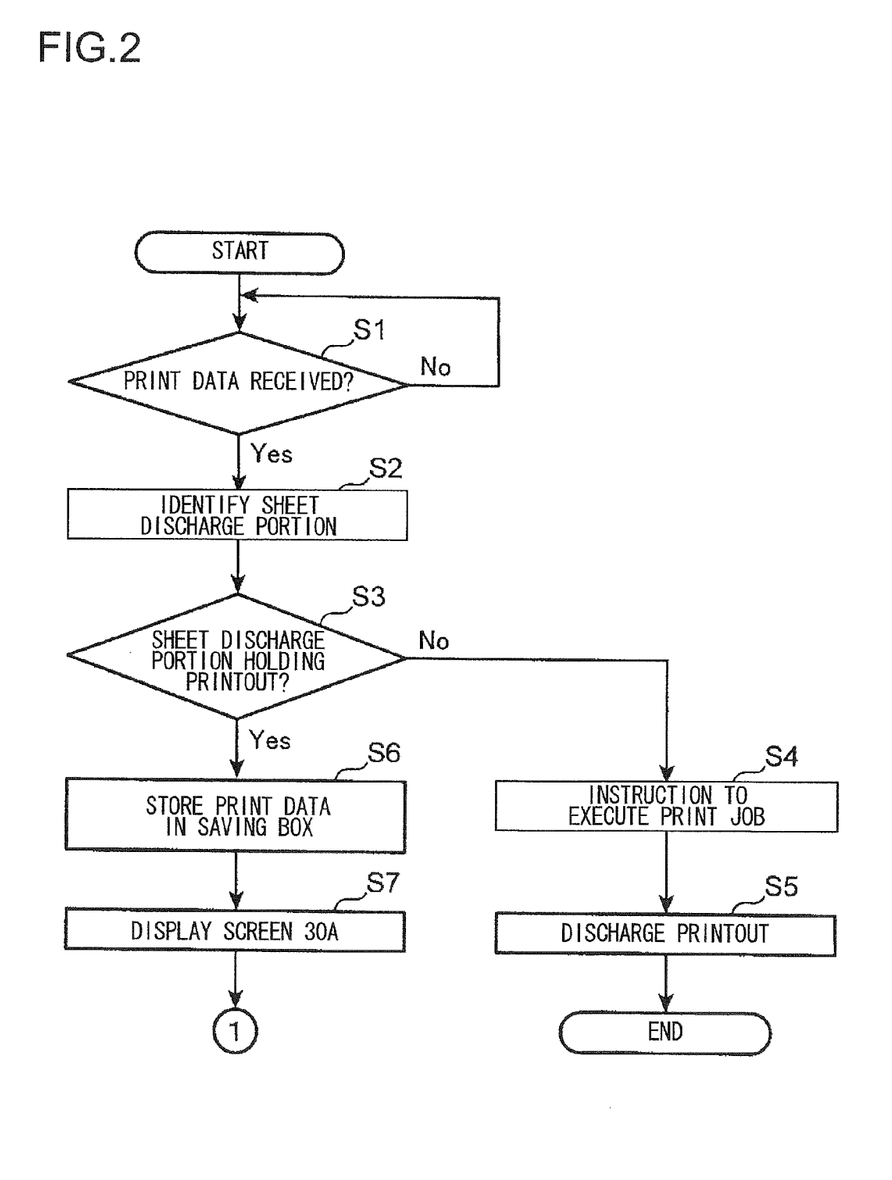
FIG. 2 is a flow chart illustrating how an image forming apparatus operates as a network printer (the first half)
Figure 3:
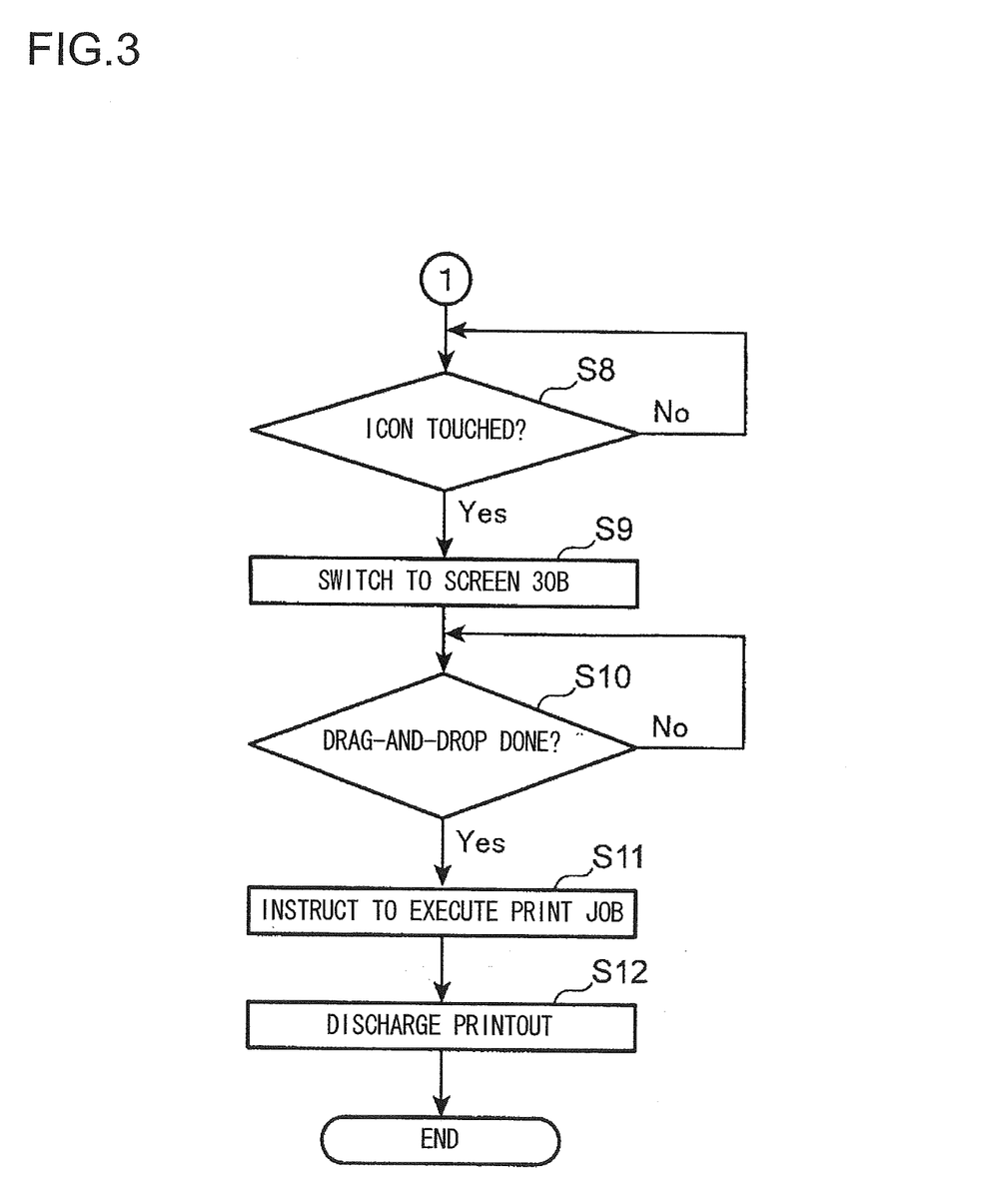
FIG. 3 is a flow chart illustrating how an image forming apparatus operates as a network printer (the latter half)

Connected to a plurality of personal computers 20 over the LAN 607, the image forming apparatus 1 can be used as a network printer. Now, how the image forming apparatus 1 operates as a network printer will be described with reference to FIGS. 1 to 3. FIGS. 2 and 3 are flow charts illustrating the operation. The following description assumes print data as data representing an image.

The job control portion 507 checks whether or not the network I/F portion 603 has received print data (Step S1). So long as the job control portion 507 does not find the network I/F portion 603 to have received print data (Step S1, No), Step S1 is repeated.

When the job control portion 507 finds the network I/F portion 603 to have received print data (Step S1, Yes), out of the three sheet discharge portions 10, the one to which to discharge the printout is identified (Step S2). To explain in more detail, the print data has appended to it information by which the personal computer 20 that has transmitted the print data can be identified. Referring to the above-mentioned assignment information stored in the assignment storage portion 502, the job control portion 507 identifies, for the received print data, the sheet discharge portion 10 to which to discharge the printout when the printing portion 100 executes a print job.

The judgment portion 505 checks whether or not the detection portion 11 corresponding to the sheet discharge portion 10 identified at Step S2 is outputting a detection signal That is, the judgment portion 505 checks whether or not the sheet discharge portion 10 identified at Step S2 is holding a printout (Step S3).

If the judgment portion 505 finds the sheet discharge portion 10 not to be holding a printout (Step S3, No), the job control portion 507 instructs the printing portion 100 to execute a print job (Step S4). For the print data received at Step S1, the printing portion 100 executes a print job, and discharges the printout to the sheet discharge portion 10 identified at Step S2 (Step S5).

If the judgment portion 505 finds the sheet discharge portion 10 to be holding a printout (Step S3, Yes), the job control portion 507 does not instruct the printing portion 100 to execute a print job, but instead stores the print data received at Step S1 in the saving box 503 (Step S6).

Subsequently to Step S6, the display control portion 501 displays a screen 30A shown in FIG. 4 on the display portion 403 (Step S7). The screen 30A is an initial screen of the image forming apparatus 1. In this embodiment, an initial screen in a copying mode serves as the initial screen of the image forming apparatus 1.

The screen 30A includes, as software keys, a plurality of keys 31 and a plurality of tabs 32. These keys 31 and tabs 32 are used to configure copying. The screen 30A functions as a first screen, and includes an icon 33. The icon 33 indicates that print data is stored in the saving box 503. In this way, when print data received by the network I/F portion 603 is stored in the saving box 503, the display control portion 501 displays on the display portion 403 the first screen including the icon 33 indicating that the print data is stored in the saving box 503.

The control portion 500 checks whether or not the icon 33 has been touched (Step S8). So long as the control portion 500 does not find the icon 33 to have been touched (Step S8, No), Step S8 is repeated.

Figure 4:
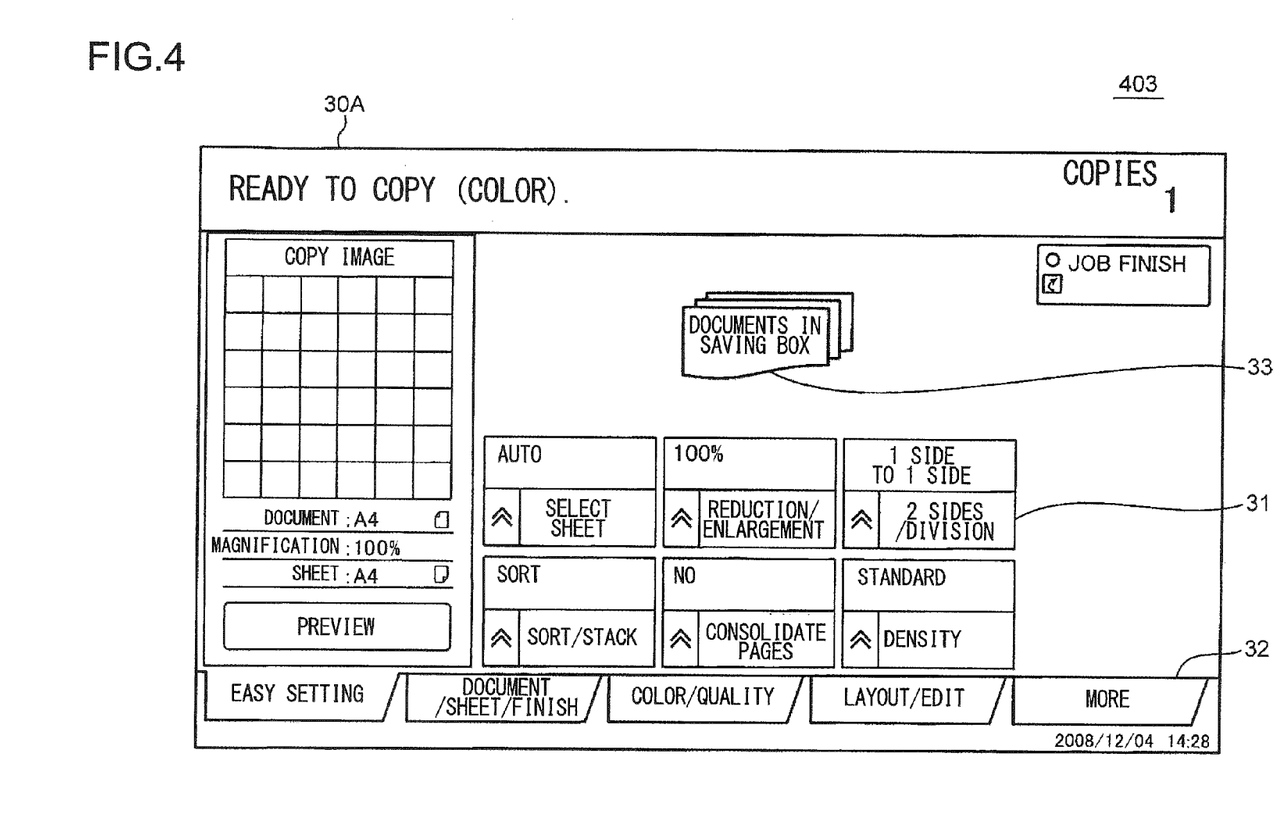
FIG. 4 is a diagram illustrating a screen including an icon indicating that print data is stored in a saving box.
Figure 5:
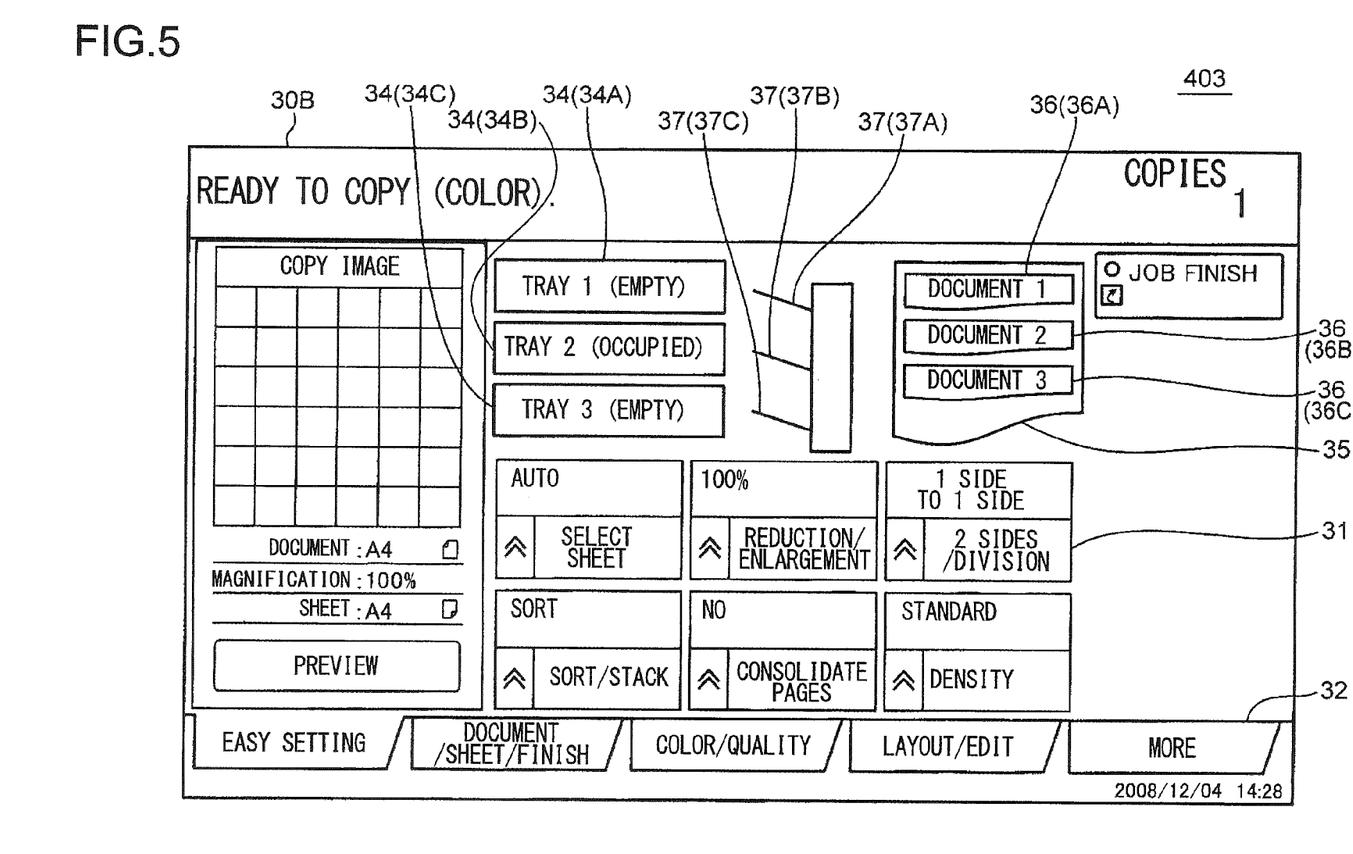
FIG. 5 is a diagram illustrating a screen that replaces the screen shown in FIG. 4 when the icon shown in FIG. 4 is pressed.

When the control portion 500 finds the icon 33 to have been touched (Step S8, Yes), the display control portion 501 switches the screen displayed on the display portion 403 from the screen 30A shown in FIG. 4 to a screen 30B shown in FIG. 5 (Step S9).

The screen 30B differs from the screen 30A in the following respects. The screen 30B does not include the icon 33. The screen 30B functions as a second screen, and includes a sheet discharge portion image 37, a list 35 containing a first information image 36, and a second information image 34.

The sheet discharge portion image 37 is an image showing an exterior view of the sheet discharge portion 10. As described previously with reference to FIG. 1, the image forming apparatus 1 is provided with three sheet discharge portions 10, and accordingly the screen 30B includes three sheet discharge portion images 37A, 37B, and 37C. The sheet discharge portion image 37A is an image showing the sheet discharge portion 10A; the sheet discharge portion image 37B is an image showing the sheet discharge portion 10B; the sheet discharge portion image 37C is an image showing the sheet discharge portion 10C. So long as no distinction is needed among the sheet discharge portion images 37A, 37B, and 37C, these are collectively referred to as the sheet discharge portion image 37.

The list 35 includes the first information image 36. The first information image 36 is an image representing the print data stored in the saving box 503. The screen 30B includes as many first information images 36 as there are sets of print data stored in the saving box 503. The screen 30B includes three first information images 36A, 36B, and 36C. This means that three sets of image data are stored in the saving box 503. So long as no distinction is needed among the first information images 36A, 36B, and 36C, these are collectively referred to as the first information image 36. The first information image 36 contains information appended to print data (e.g., a document name and a user name).

The second information image 34 is an image corresponding to the sheet discharge portion 10. The screen 30B includes as many second information images 34 as there are sheet discharge portions 10. The image forming apparatus 1 is provided with three sheet discharge portions 10, and accordingly the screen 30B includes three second information images 34A, 34B, and 34C. The second information image 34A is used to select the sheet discharge portion 10A; the second information image 34B is used to select the sheet discharge portion 10B; the second information image 34C is used to select the sheet discharge portion 10C. So long as no distinction is needed among the second information images 34A, 34B, and 34C, these are collectively referred to as the second information image 34.

The second information image 34 indicates whether or not the corresponding sheet discharge portion 10 is holding a printout. In the second information image 34, "Empty" indicates that the sheet discharge portion 10 is not holding a printout; "Occupied" indicates that the sheet discharge portion 10 is holding a printout. Accordingly, here, the second information image 34A indicates that the sheet discharge portion 10A is not holding a printout; the second information image 34B indicates that the sheet discharge portion 10B is holding a printout; the second information image 34C indicates that the sheet discharge portion 100 is not holding a printout. In this way, for each of the plurality of sheet discharge portions 10, the display control portion 501 displays on the display portion 403 the second screen containing information indicating whether or not it is holding a printout.

As described above, when the icon 33 (FIG. 4) is touched, the display control portion 501 displays on the display portion 403 the screen 30B (second screen) which includes, as shown in FIG. 5, the list 35 of the first information image 36 indicating the image data stored in the saving box 503 and the plurality of second information images 34 corresponding to the plurality of sheet discharge portions 10 respectively.

Figure 6:
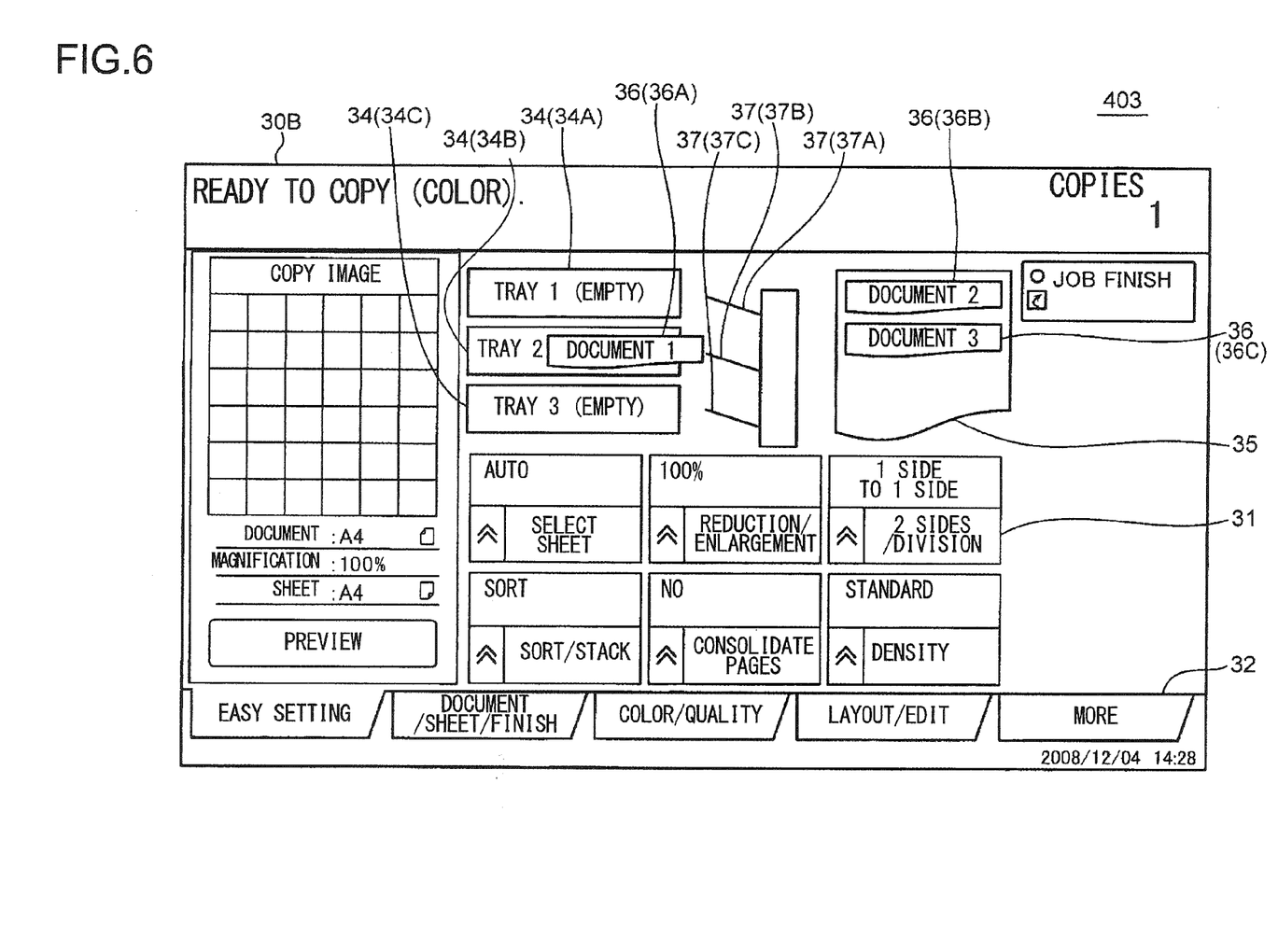
FIG. 6 is a diagram illustrating an operation for selecting a sheet discharge portion to which to discharge a printout.

The job control portion 507 checks whether or not a drag-and-drop operation has been done on the screen 30B (Step S10). Here, a drag-and-drop operation denotes an operation in which a user drags the first information image 36 corresponding to the print data he wants printed and then drops it on the second information image 34 corresponding to the sheet discharge portion 10 to which he wants the printout discharged. In FIG. 6, the first information image 36A is being drag-and-dropped on the second information image 34B corresponding to the sheet discharge portion 10B.

So long as the job control portion 507 does not find a drag-and-drop operation to have been made (Step S10, No), Step S10 is repeated.

When the job control portion 507 finds a drag-and-drop operation to have been made (Step S10, Yes), then, for the print data corresponding to the first information image 36 that has been drag-and-dropped, the job control portion 507 instructs the printing portion 100 to execute a print job (Step S11).

For the print data corresponding to the first information image 36 drag-and-dropped at Step S10, the printing portion 100 executes a print job, and discharges the printout to the sheet discharge portion 10 (Step S12). Here, the print job is executed for the print data corresponding to the first information image 36A, and the printout is discharged to the sheet discharge portion 10B.

The main benefits of this embodiment are as follows. With the image forming apparatus 1 according to this embodiment, if a sheet discharge portion 10 to which a printout is to be discharged is already holding another printout (Step S3, Yes), then, for print data received by the LAN 607, the job control portion 507 inhibits the printing portion 100 from executing a print job, and instead stores the print data in the saving box 503 (Step S6). When a user operates the operation portion 400 and enters an instruction to print (Step S10, Yes), then, for the print data stored in the saving box 503, the job control portion 5 makes the printing portion 100 execute a print job (Steps S11 and S12). In this way, when a printout is discharged to a sheet discharge portion 10, the user is beside the image forming apparatus 1; this prevents the printout from being taken away by mistake by another user.

Moreover, with the image forming apparatus 1 according to this embodiment, the job control portion 507 checks whether or not there have been entered on the operation portion 400 a first instruction to select, out of one or more sets of print data stored in the saving box 503, the one that is the target of a print job and a second instruction to select, out of a plurality of sheet discharge portions 10, the one to which a printout is to be discharged (Step S10), and when it is found that a first and a second instruction have been entered (Step S10, Yes; FIG. 6), then, for the print data selected by the first instruction, the job control portion 507 makes the printing portion 100 execute a print job and has the printout discharged to the sheet discharge portion 10 selected by the second instruction (Steps S11 and S12). Thus, when a printout in which an image represented by print data stored in the saving box 503 is printed is produced, a sheet discharge portion 10 to which to discharge the printout can be selected.

Furthermore, with the image forming apparatus 1 according to this embodiment, the job control portion 507 checks whether or not, in the screen 30B (second screen) shown in FIG. 5, a first information image 36 has been drag-and-dropped on any of a plurality of second information images 34 (Step S10), and when it is found that such a drag-and-drop operation has been done (Step S10, Yes; FIG. 6), then the job control portion 507 accepts the drag-and-drop operation as a first and a second instruction; that is, for the print data represented by the drag-and-dropped first information image 36A, the job control portion 507 makes the printing portion 100 execute a print job and has the printout discharged to the sheet discharge portion 10B corresponding to the second information image 34B on which the first information image 36A was dropped (Steps S11 and S12). Thus, for print data stored in the saving box 503, an operation for making the printing portion 100 execute a print job can be done easily and intuitively.

Moreover, according to this embodiment, as shown in FIG. 5, the display control portion 501 displays on the display portion 403 a screen 30B (second screen) including information indicating whether or not a printout is being held in each of a plurality of sheet discharge portions 10. The job control portion 507 accepts as a second instruction either selection of a sheet discharge portion 10B holding a printout or selection of a sheet discharge portion 10A or 10C holding no printout.

Accordingly, when a user enters an instruction to print on the operation portion 400 for an image represented by print data stored in the saving box 503, he can flexibly proceed to suit the situation. For example, if a user does not want a printout discharged to a sheet discharge portion 10B holding a printout, he can select a sheet discharge portion 10A or 10C holding no printout.

On the other hand, when a user selects a sheet discharge portion 10 (10A or 10C) holding no printout to have a printout discharged to it, if immediately thereafter data from a second user that is to be discharged to the same sheet discharge portion 10 is received by the network I/F portion 603, then, for this print data, no print job is executed but the print data is stored in the saving box 503. This causes the second user trouble. In view of this possibility, a user can choose to have a printout discharged to a sheet discharge portion 10B holding a printout. Even if a user has a printout discharged to the sheet discharge portion 10B holding a printout, he, immediately after entering an instruction to print for an image represented by print data stored in the saving box 503, is beside the image forming apparatus 1. Thus, there is no danger of the printout being taken away by another user.

In this embodiment, when a drag-and-drop operation is done (Step S10, Yes), a print job is executed (Steps S11 and S12). Instead, after a drag-and-drop operation is done, a print job can be executed at the press of the START key on the operation portion 400.

What is claimed is:

1. An image forming apparatus comprising:
a reception portion which receives data representing an image and transmitted over a network;
a printing portion which executes a print job whereby a printout is produced in which the image represented by the data is printed;
a sheet discharge portion to which the printout produced by the printing portion is discharged and which holds the discharged printout;
a detection portion which outputs a detection signal when the sheet discharge portion is holding the printout;
a storage portion;
a judgment portion which, when the reception portion receives the data, checks whether or not the detection portion is outputting the detection signal with respect to the sheet discharge portion to which the printout is to be discharged when the print job is executed for the data received by the reception portion;
a job control portion which, when the judgment portion finds the detection portion to be outputting the detection signal, inhibits the printing portion from executing the print job for the data received by the reception portion and instead stores the data in the storage portion; and
an operation portion on which, for the image represented by the data stored in the storage portion, an instruction to print is entered,
wherein
when the instruction to print is entered on the operation portion, the job control portion makes the printing portion execute the print job for the data stored in the storage portion.

2. The image forming apparatus of claim 1, wherein
the sheet discharge portion comprises a plurality of sheet discharge portions, and
the job control portion checks whether or not there have been entered on the operation portion
a first instruction to select, out of data stored in the storage portion, the data which is to be a target of the print job and
a second instruction to select, out of the plurality of sheet discharge portions, the sheet discharge portion to which the printout is to be discharged, and
on finding that the first and second instructions have been entered, the job control portion makes the printing portion execute the print job for the data selected by the first instruction and has the printout discharged to the sheet discharge portion selected by the second instruction.

3. The image forming apparatus of claim 2, further comprising:
a display portion; and
a display control portion
which, when the data received by the reception portion is stored in the storage portion, displays on the display portion a first screen including an icon indicating that the data is stored in the storage portion and
which, when the icon is touched, displays on the display portion a second screen including
a list of a first information image representing the data stored in the storage portion and
a plurality of second information images corresponding to the plurality of sheet discharge portions respectively,
wherein the job control portion checks whether or not the first information image has been drag-and-dropped on one of the second information images and, on finding that such a drag-and-drop operation has been done, the job control portion accepts the drag-and-drop operation as the first and second instructions, the job control portion then making the printing portion execute the print job for the data represented by the drag-and-dropped first information image and having the printout discharged to the sheet discharge portion corresponding to the second information image on which the first information image has been drag-and-dropped.

4. The image forming apparatus of claim 3, wherein
the display control portion displays on the display portion the second screen including information indicating, for each of the plurality of sheet discharge portions, whether or not the printout is held therein, and
the job control portion accepts as the second instruction either selection of a sheet discharge portion holding the printout or selection of a sheet discharge portion holding no printout.

\* \* \* \* \*